Sept. 10, 1963  R. F. SARGENT ET AL  3,103,102
PROPULSION POWER PLANTS FOR AIRCRAFT
Filed July 10, 1959  6 Sheets-Sheet 1
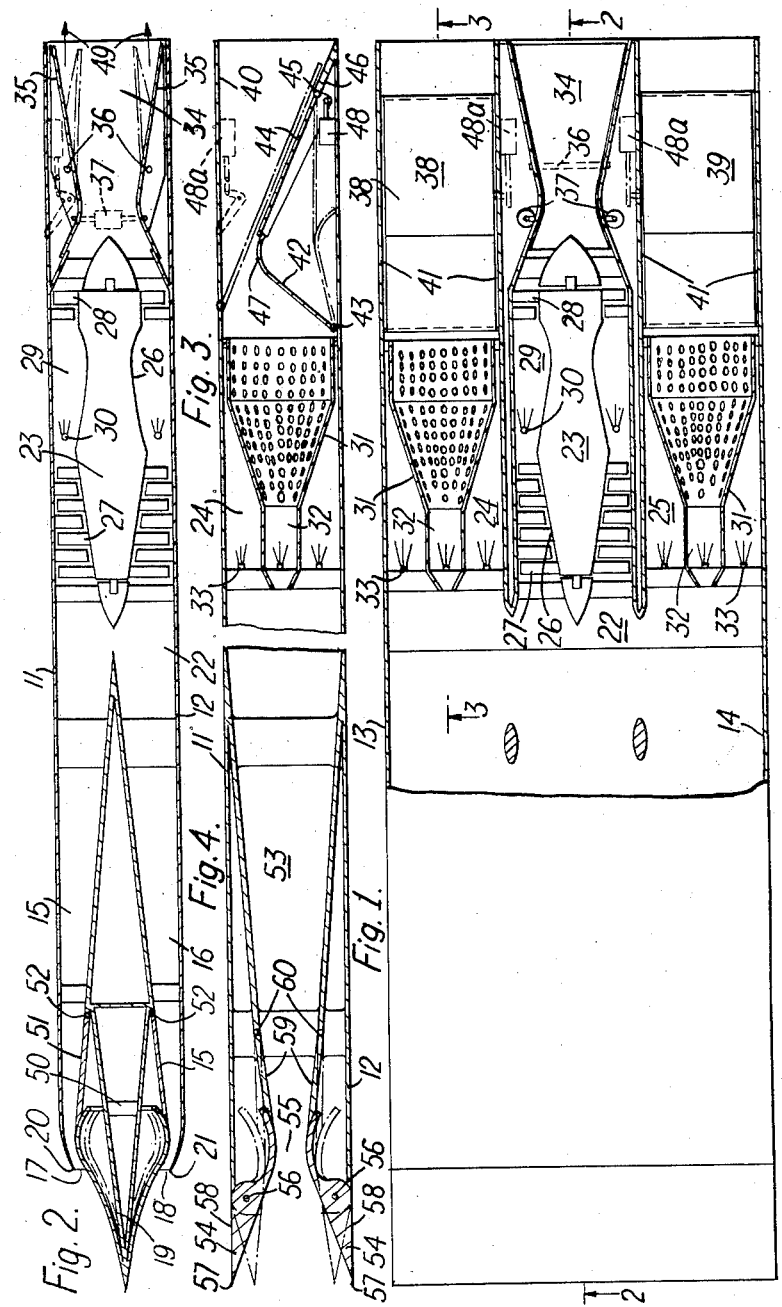
Inventors
Raymond Frederick Sargent
Raymond John Lane
By
Bailey, Stephens & Huettig  Attorneys

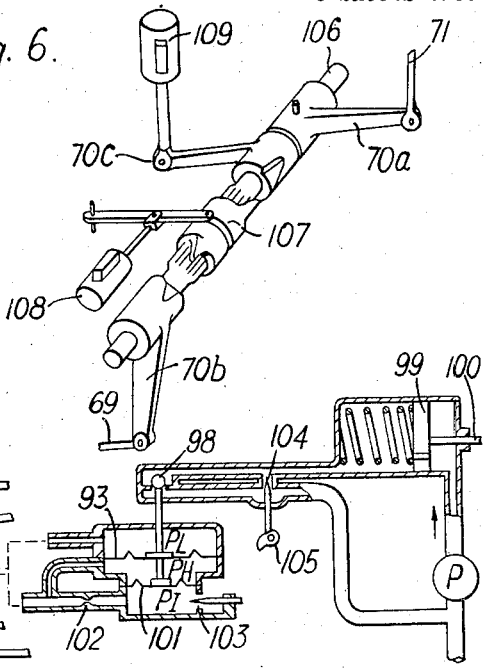
Fig. 6.
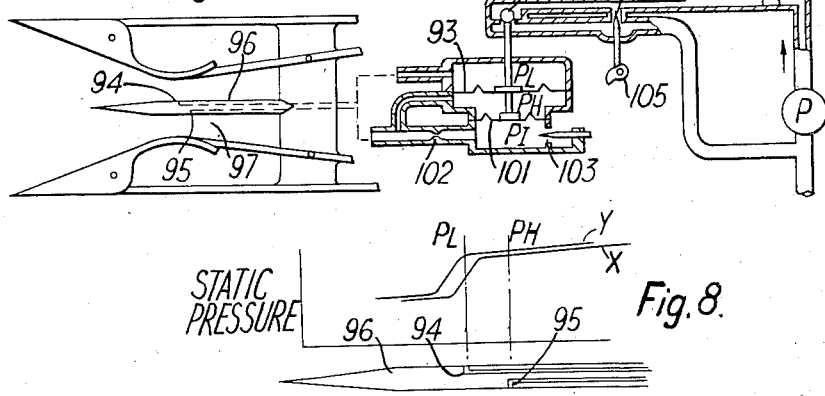
Fig. 7.
Fig. 8.
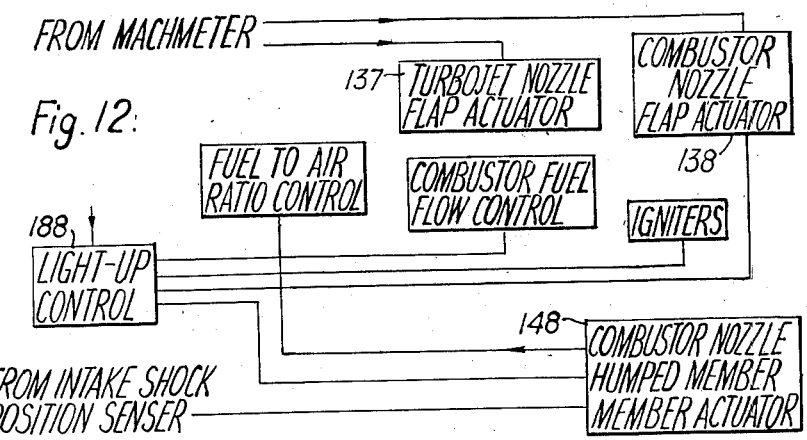
Fig. 12.

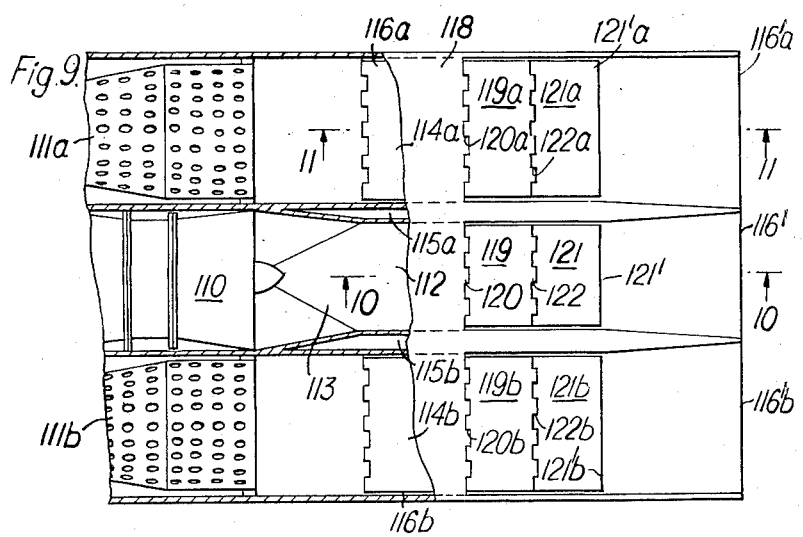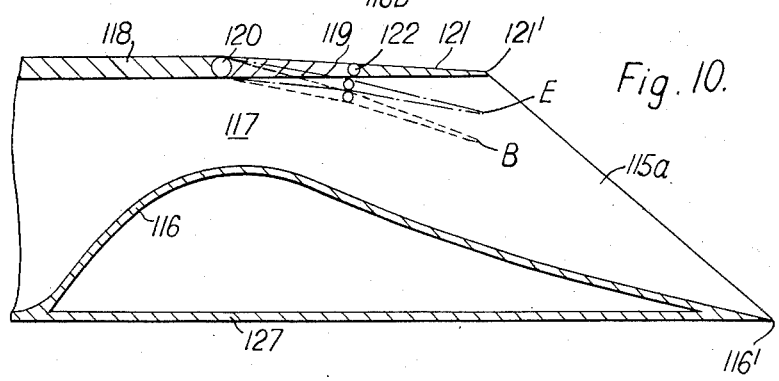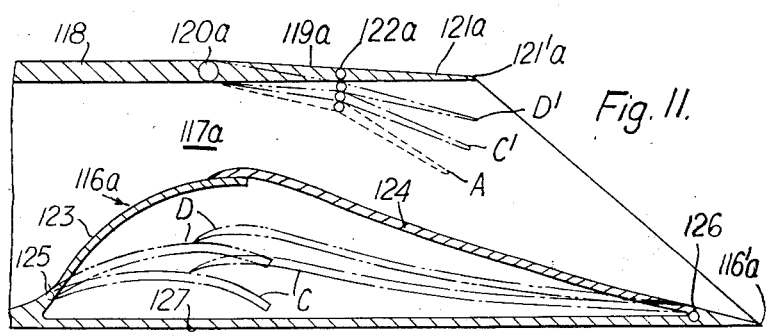

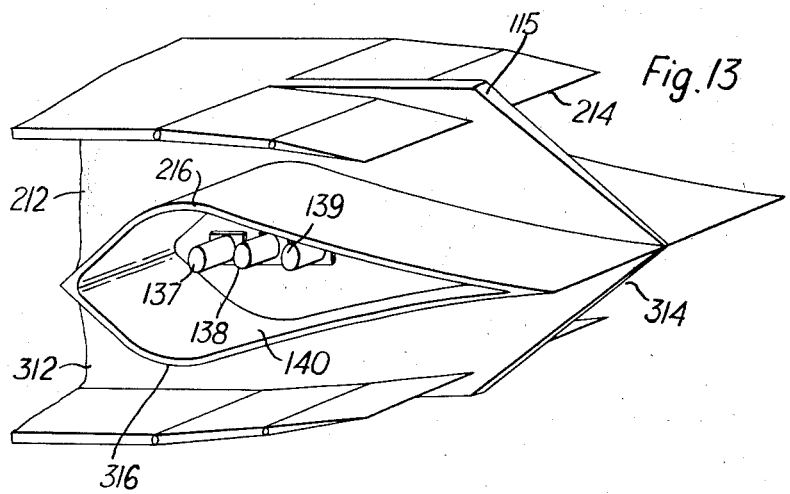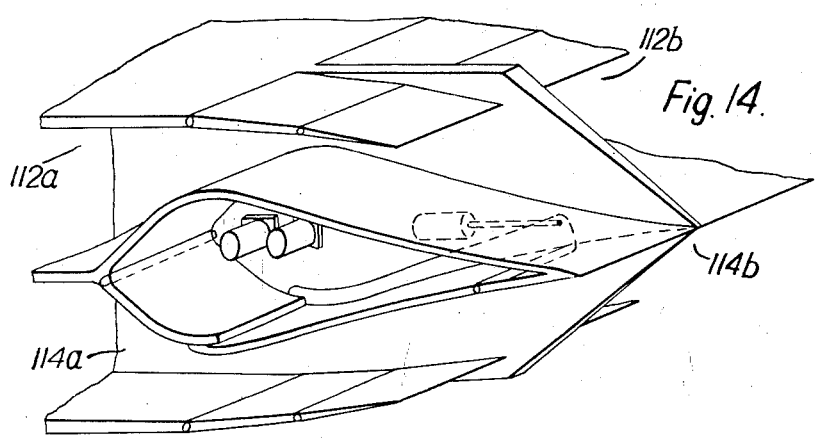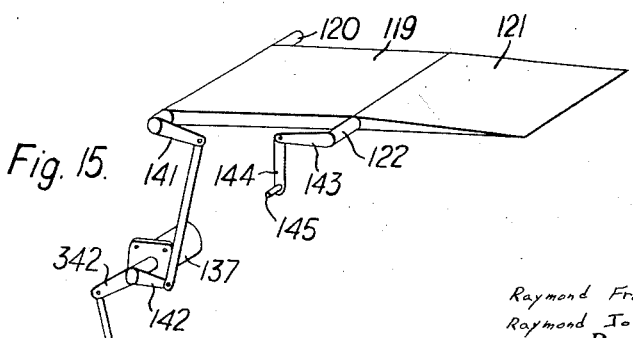

Sept. 10, 1963  R. F. SARGENT ET AL  3,103,102
PROPULSION POWER PLANTS FOR AIRCRAFT
Filed July 10, 1959  6 Sheets-Sheet 6

Inventors
Raymond Sargent
Raymond John Lane
By
Bailey, Stephens & Huettig
Attorneys Patented Sept. 10, 1963

3,103,102
PROPULSION POWER PLANTS FOR AIRCRAFT
Raymond Frederick Sargent and Raymond John Lane, Bristol, England, assignors to Bristol Siddeley Engines Limited, Bristol, England, a British company
Filed July 10, 1959, Ser. No. 826,319
Claims priority, application Great Britain July 18, 1958
7 Claims. (Cl. 60—35.6)

This invention relates to aircraft jet propulsion power plants including a turbojet engine and a ramjet engine and intended for flight at supersonic cruising speeds.

According to the invention an aircraft jet propulsion power plant comprises a diffuser duct having a forwardly facing air intake opening and an outlet end, a turbojet engine and a combustor duct both connected to receive air from the outlet end of the diffuser duct, and separate adjustable propulsion nozzles connected to receive the working fluid streams which have passed through the turbojet engine and combustor ducts respectively. The combustor duct in combination with its propulsion nozzle and the diffuser duct constitutes a ramjet propulsion system.

The plant may comprise more than one turbojet engine and/or more than one combustor duct but the arrangement should be such that each turbojet engine has a combustor duct adjacent to it, and each combustor duct has a turbojet engine adjacent to it, so that both can receive air from the same part of the intake.

During take-off and acceleration or climb to a high subsonic Mach number, e.g. Mach 0.8, the combustor ducts do not operate. Then at a high subsonic Mach number the combustor ducts are lit up. The full power of the turbojet engine and of the combustor ducts is required to accelerate through the transonic range, but thereafter an excess of power becomes available and it is preferred to throttle back the turbojet engine, in the interest of fuel economy, since under these conditions the specific fuel consumption of the turbojet engine is higher than that of the combustor ducts.

When an aircraft propelled by the plant passes through its range of operating speeds, the area of intake opening necessary to supply the demands of the turbojet engine is out of step with the area of intake opening necessary to supply the demands of the combustor duct, so that by supplying both from a common diffuser, and by suitably regulating their respective air demands by means of the separate propulsion nozzles, the necessary range of variation of intake opening area is at least substantially reduced and may in some cases be made to vanish. Nevertheless it is preferred, in a plant intended for cruising speeds substantially in excess of Mach 1, to provide for adjustment of the intake throat area.

According to a feature of the invention the air intake when arranged to be adjustable is provided with control means responsive only to the aircraft flight Mach number.

According to further features of this invention the power plant has a control system wherein a power selector acts upon a fuel flow control for the turbojet engine and a fuel flow control for the combustor duct in a varying ratio dependent upon the aircraft flight Mach number, the divergence of the turbojet propulsion nozzle is adjusted in dependence upon the aircraft flight Mach number, and the throat area of the combustor duct propulsion nozzle is adjusted in dependence upon the position of a normal shock wave in the air intake so as to maintain such shock wave in a desired position.

Before light up the combustor ducts may be closed, or adjusted to a state of minimum drag.

According to a further feature of the invention all the propulsion nozzle passages are substantially rectangular in cross-section, are arranged side by side and separated by partitions, and each passage comprises on one side transverse to the partitions a boundary member which is humped to produce a constriction in the passage and on the opposite side a boundary member comprising a fixed part extending upstream from the zone of the constriction and a movable part extending downstream from the fixed part to a trailing edge spaced upstream from the trailing edge of the humped boundary member, the movable part being deflectable, by hinging or distortion, to permit movement of its trailing edge from a position in alignment with the fixed part to a position nearer the humped boundary member, and so as to present a generally concave curvature towards the humped boundary member. The humped boundary member of each passage pertaining to a combustor duct may be adjustable to vary the width of the constriction formed between the crest of the hump and the fixed part of the other boundary member.

The invention is illustrated by the examples shown schematically in the accompanying drawings in which:

FIGURE 1 is a view partly in plan (or elevation) and partly in section of a propulsion plant comprising a turbojet engine with a combustor duct on each side of it, the plane of the section containing the axes of the engine and of the combustor ducts;

FIGURE 2 is a section through the plant taken along the line 2—2 in FIGURE 1;

FIGURE 3 is a section through one of the combustor ducts taken along the line 3—3 in FIGURE 1;

FIGURE 4 is a section corresponding to the left-hand half of FIGURE 2 through a plant having a modified form of intake and diffuser;

FIGURE 6 is a perspective sketch of a detail;

FIGURE 7 is a diagram of another detail;

FIGURE 8 is a graph illustrating the operation of FIGURE 7;

FIGURE 9 is a plan view, partly sectioned, of a rear end part of a propulsion power plant comprising a turbojet engine flanked on each side by a combustor duct;

FIGURE 10 is a vertical section through the jet nozzle passage pertaining to the turbojet engine and corresponds to the line 10—10 in FIGURE 9;

FIGURE 11 is a similar section through one of the combustor duct jet nozzle passages, corresponding to the line 11—11 in FIGURE 9;

FIGURE 12 is a diagram of part of a control system;

FIGURES 13 and 14 are fragmentary perspective sketches of alternative nozzle layouts;

FIGURE 15 is a perspective sketch of a flap; and

Figure 5:
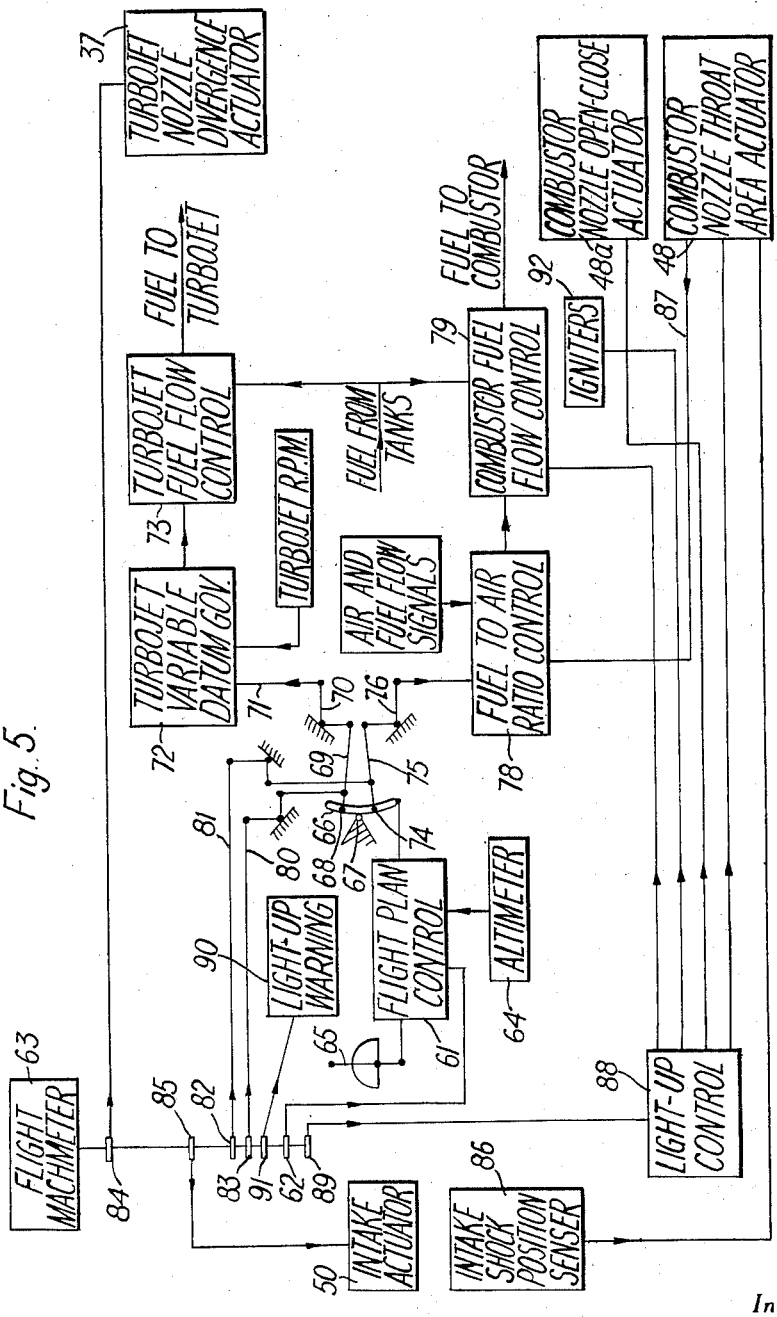
FIGURE 5 is a diagram of a control system.

The propulsion power plant shown in FIGURES 1, 2 and 3 is bounded by two pairs of substantially flat walls 11, 12 and 13, 14. For convenience the walls 11 and 12 will be referred to as the top and bottom walls and the walls 13 and 14 as the side walls, as would be the case when the unit is embodied for example in a wing or other plane of an aircraft which provides lift. The plant could however be disposed in an aircraft with the walls 13 and 14 as the top and bottom walls.

Approximately the forward half of the space enclosed between the four walls is occupied by a diffuser consisting of upper and lower divergent channels 15 and 16 extending from forwardly facing intake openings 17 and 18 disposed on opposite sides of a wedge member 19. The shape of the wedge member is chosen so that, at the cruising flight Mach number for which the plant is designed, oblique shock waves from the tip of the wedge and iso-Mach number lines from its flanks converge into a focal region near lips 20 and 21 constituted by the upstream edges of the top and bottom walls 11 and 12.

Under these conditions, and provided that a shock wave normal to the airflow stream lines, which is formed where the velocity of flow changes from supersonic to subsonic, is maintained at a suitable position in the inflow passage, the intake operates at maximum pressure recovery efficiency and with minimum drag. For operation at low supersonic velocities it is preferably that the normal shock waves should be located at or closely downstream of the lips 20 and 21 but at higher supersonic velocities it is advantageous to arrange the inflow passages with an initial convergence and to locate the normal shock waves at the throats so formed. In its passage through the divergent diffuser channels 15 and 16 to their common outlet end 22 the velocity of the inflowing air is further decreased and its pressure is increased.

Extending rearwards from the outlet end 22 of the diffuser are a turbojet engine 23 and two combustor ducts 24 and 25 lying side by side and occupying substantially the whole of the cross-sectional area between the four walls 11, 12, 13 and 14. The turbojet engine is shown conventionally as comprising a rotor 26 with compressor blades 27 and turbine blades 28, and a combustion system 29 including fuel sprayers 30. The combustor ducts 24 and 25 are also shown conventionally as comprising a flame tube 31 with pilot combustion zone 32 and fuel sprayers 33. The turbojet engine 23 and the two combustor ducts all receive air from the common outlet end 22 of the diffuser.

The products of combustion leaving the turbojet engine pass through a propulsion nozzle 34 which is adjustable by means of a pair of opposite wall members 35 which are mounted on pivots 36 and may be tilted by actuators 37. The members 35 have flexible front ends 35a which are restrained in sliding relation with the casing of the turbojet engine. The tilting of the wall members principally adjusts the divergence of the nozzle by varying its outlet area so that it can operate efficiently over a range of jet flow Mach numbers, but, according to the position chosen for the pivots 36, a simultaneous variation of the throat area of the nozzle can be obtained for the purpose of adjusting the back pressure of the engine and consequently its consumption of air at a given diffuser outlet pressure.

The products of combustion leaving the combustor ducts 24 and 25 pass through adjustable propulsion nozzles 38 and 39 each having flat top walls 40, flat side walls 41 and an adjustable bottom wall composed of a forward part 42, which is hinged at its forward end 43 to the bottom wall of the duct, and a rear part 44 which is hinged at its rear end 45 to a short divergent bottom wall part 46. The forward part 42 has a curved rear end 47 which forms the throat of the nozzle, while the part 44 constitutes the main divergent part of the nozzle. By turning the parts 42 and 44 about their hinges by means of an actuator 48, while keeping their adjacent ends together in sliding relationship, the throat area of the nozzle and its rate of divergence may be adjusted. This adjustment is used principally for controlling the back pressure in the combustor ducts and therefore in the diffuser to maintain the normal shock waves in the desired position in the intake, but it also provides a means of controlling the relative quantities of air passing through the combustor ducts and the turbojet engine.

Before light-up, the combustor duct nozzles 38 and 39 are closed completely. To permit such closure, the upper walls 40 of the nozzles are hinged at their forward ends and may be swung downwards by actuators 48a into the position shown in chain-dotted lines in FIGURE 3. This produces a tapered external configuration which reduces the external drag. During this phase the turbojet nozzle members 35 are also adjusted to a convergent position as shown by the chain-dotted lines in FIGURE 2. To reduce the drag produced by the dead spaces above and below the members 35 when in this position some air from the combustor ducts may be allowed to flow out through these spaces as indicated by arrows 49.

Until light-up of the combustor ducts, substantially the whole of the inflowing air is consumed by the turbojet engines, and, since there are no divisions in the intake or diffuser between the turbojet engine and the combustor ducts, the whole length of the intake is available for the entry of this air. After light-up of the combustor ducts, and during a further period of acceleration or climb, the air requirement of the combustor ducts will increase and exceed that of the turbojet engine. This effect may be increased by throttling back the turbojet engine, but in any case, in this range of higher Mach numbers, an intake throat area which is sufficient to meet the low speed requirements of the plant will easily admit sufficient air to run both the turbojet engine and the combustor ducts at their respective maximum thrusts if required. On the other hand, it is undesirable to have an excessive throat area at the high speeds, since this would involve operation at too low a fuel-to-air ratio for economy. Since at the lower end of this range the greater proportion of the intake mass flow will be taken by the turbojet engine, while at the upper end of the range the major proportion will be taken by the combustor ducts, a simplification in the control of the intake throat area, and a reduction in the range of adjustment required, is obtained by supplying the turbojet engines and the combustor ducts from a common diffuser.

In the example shown in FIGURE 2, adjustment of intake throat area is achieved by arranging for the flanks of the wedge 19 to be movable inwards by an actuator 50. To follow the movements of these flanks, parts 51 of the inner walls of the diffuser channels 15 and 16 are hinged at their rear ends 52 and are maintained at their forward ends in sliding relation with the flanks.

FIGURE 4 shows an alternative arrangement in which the diffuser has a single channel 53, and the wedge is replaced by a pair of half wedges 54, one flank of each of which is aligned respectively with the top and bottom walls 11 and 12 of the plant, and the other flanks of which form a convergent entry passage with a throat at 55. To permit the throat to be varied in width, the half wedges 54 are mounted upon pivots 56, arranged at a position intermediate between their tips 57 and the throat 55. By turning the half wedges to positions such as those shown in chain-dotted lines, the throat area is increased, and the outwardly turned flanks 58 are brought to a divergent position, in which the drag of the plant at speeds below the designed cruising speed is reduced. Portions 59 of the diffuser wall are again hinged at 60, to permit them to follow the movements of the half wedges 54.

FIGURE 5 shows a preferred form of control system for operating the plant. The power output of the plant is automatically selected by a flight plan control 61, which receives signals from a transmitter 62 operated by a flight Machmeter 63, and from an altimeter 64, and the function of which is to control the power plant to propel the aircraft at an airspeed providing optimum efficiency of operation at each altitude. A pilot's control 65 allows the flight plan control 61 to be adjusted, at any altitude below the aircraft's ceiling altitude, to control the airspeed within permissible limits such that the aircraft neither stalls on the one hand nor is exposed to excessive aerodynamic heating or other stress on the other. Preferably, in the case of an aircraft designed for an economical cruising speed Mach number in excess of the Mach number at which the aircraft can be flown at sea level, the flight plan control provides for a substantially linear increase of flight Mach number with altitude up to the altitude at which the cruising Mach number is attainable, and thereafter the flight Mach number is held constant with increase of altitude.

The output from the flight plan control 61 is transmitted, in proportions varying with the flight Mach number, to fuel control systems pertaining to the turbojet engine and the combustor ducts respectively. The arrangement is represented diagrammatically as an output lever 66 pivoted at 67 and rocked by the flight plan control 61. The lever 66 has an arcuate slot carrying a slide 68 for turbojet engine control, connected through rods and levers 69, 70 and 71 to a variable-datum speed governor 72, which is responsive to compressor r.p.m. and acts upon a fuel flow control 73. A similar slide 74 for combustor duct control is connected through rods and levers 75, 76 and 77 to a variable-datum governor in the form of a fuel-to-air ratio control 78, which is responsive to air and fuel flow signals and acts upon a fuel flow control 79. The fuel-to-air ratio is thus held constant except as varied by the action of the flight plan control 61 to increase or decrease the thrust.

The slides 68 and 74 are adjusted along the slot by transmissions 80 and 81 conveying signals from transmitters 82, 83 operated by the flight Machmeter 63. The signal transmitters 82, 83, and 62 are cams rotated by the Machmeter. From zero flight speed up to the high subsonic Mach number, at which the combustor ducts are to be lighted, the slide 74 associated with the combustor control system is held adjacent to the pivot 67, so that no control action is transmitted from the flight plan control to the fuel-to-air ratio control 78. Concurrently the slide 68 is held displaced from the pivot 67 so that the control signals are transmitted to the turbojet governor 72. During further acceleration from the light-up Mach number, the signal transmitter 83 moves the slide 68 progressively towards the pivot 67 with increasing Mach number, until the cruising Mach number is reached.

Alternatively, however, the system may be so constructed that during the phase after light-up the turbojet engine is isolated from the flight plan control 61, and is allowed to run at constant r.p.m., or at a reducing r.p.m. under the control of the Machmeter 63. FIGURE 6 shows an arrangement to achieve this. The lever 70 is in three arms, one 70a fixed to a shaft 106, and the others 70b, 70c loose on the shaft. The arm 70a is connected by the link 71 to the turbojet governor 72. A sleeve 107 splined to the shaft can be slid to and fro by a servo motor 108 controlled by the Machmeter so as to clutch either with the arm 70b, which is connected by the link 69 to the flight plan control, or with the arm 70c, which is operated by another servo 109 controlled by the Machmeter.

From about Mach 1 upwards, the divergence of the turbojet nozzle 34 requires to be progressively increased, and for this purpose signals are transmitted from the Machmeter by a further transmitter 84 through a conventional closed loop servo system to the nozzle actuators 37. Also from about Mach 1 upwards, the intake requires adjustment to decrease the throat area. For this purpose signals are transmitted from the Machmeter by a transmitter 85 through a conventional closed loop servo system to the intake actuator 50.

The combustor nozzle throat area actuator 48 is controlled by a device 86 sensitive to the position of the normal shock wave in the intake. This device, as shown in FIGURE 7, comprises diaphragms 93, 101 which are subjected to pressures conveyed from ports 94, 95 in the wall of a probe 96 in the inflow passage 97 at and immediately downstream of the position in which the shock wave is required to be located. The diaphragms 93 and 101 are interconnected and together control a ball valve 98 which in turn controls the operation of a servo piston 99 connected at 100 by conventional means to control the combustor nozzle throat area actuator 48. The servo motor 99 is powered by fluid from a supply indicated as a pump P. The port 94 supplies a low pressure $P_L$ above the diaphragm 93. The port 95 supplies a high pressure $P_H$ below the diaphragm 93. The diaphragm 101 is subjected above to the pressure $P_H$ and below to an intermediate pressure $P_I$ derived by bleeding air through a restriction 102 and an adjustable restriction 103. The diaphragms are in a state of balance at a given ratio between $P_L$ and $P_H$, which is determined by the setting of the adjustable restriction 103.

FIGURE 8 is a graph in which static pressure is plotted against distance along the pick-up probe 96. Curve X shows the stabilised condition in which the port 94 is about halfway through the wave and the port 95 is in the high pressure zone behind the wave. The diaphragm system is then in balance giving a small upward force holding the ball valve 98 a little open, and the servo piston is in an intermediate position. If the wave now moves forward to condition Y the upward force disappears, the ball valve closes, the piston 99 moves towards the right and the combustor duct nozzle opens. The pressure in the diffuser consequently falls and the normal shock wave moves rearwards. Likewise if the wave moves too far rearwards, the ball valve opens more and the nozzle closes.

From light-up until the normal shock wave forms at supersonic speeds, the ball valve 98 is overridden by a needle valve 104 operated by a further cam 105 turned by a light-up control 88, described below.

To prevent a condition arising in which the normal shock wave is forced out of the intake opening owing to the fuel-to-air ratio control being set to a value above that corresponding to the maximum opening of the nozzle, the combustor nozzle throat area actuator 48 is arranged, as indicated by the connection 87, to transmit back to the fuel-to-air ratio control 78 a ratio-limiting signal when it approaches the end of its nozzle-opening movement.

Light-up of the combustor ducts is effected by the light-up control 88, which may be operated by a signal transmitter 89 operated by the flight Machmeter, or by a pilot's control. In either case, a light-up warning 90 is preferably provided, operated by a signal transmitter 91 when the light-up Mach number is being approached. The light-up control 88 operates the actuators 48a to open the closure flaps 40 of the combustor duct nozzles, starts the fuel flow control 79, and operates igniters 92 in the combustor ducts. It may also operate the combustor nozzle throat area actuator 48, as mentioned above, until a speed is reached at which control of this actuator can be taken over by the intake shock wave position senser 86. The light-up control operates the actuator 48 by transmitting movements to the cam 105 (FIGURE 7) which are solely dependent on flight Mach number. From then onwards, through increasing Mach numbers to the cruising speed, the fuel supply to the combustor ducts is under the control of the flight plan control 61, as influenced by the pilot, while the combustor duct nozzles 38 and 39 are under the control of the intake shock wave senser 86 to keep the intake operating at maximum pressure recovery.

The power plant of which the rear end is shown in FIGURE 9 again comprises a forwardly facing air intake of the single or multiple shock type supplying air into a diffuser duct to which at its rear end are connected a turbojet engine 110 and two combustor ducts 111a and 111b arranged side by side. The gas flow from the turbojet engine 110 passes into a rectangular section propulsion nozzle passage 112 by way of a transition passage 113 which changes from circular section at its end adjacent the turbojet engine to rectangular at its junction with the nozzle passage 112. The combustor ducts 111a and 111b are themselves rectangular in section and connect directly to rectangular section propulsion nozzle passages 114a and 114b respectively. The passages 112, 114a are separated from one another by partitions 115a and 115b which may conveniently be of hollow construction and house operating mechanism for adjustable parts of the nozzle system presently described.

Each of the passages 112, 114a and 114b comprises on its underside, transverse to the partitions 115a and 115b, a boundary member 116, 116a and 116b which is humped to produce a constriction, 117, 117a and 117b respectively, in the passage. The sides of the passages opposite the humped boundary members are bounded in part by a fixed part 118 extending upstream from the zone of the constrictions and in part by a system of hinged flaps. Thus the rear end of the turbojet nozzle passage 112 is bounded at the top by a flap consisting of a part 119 hinged at 120 to the fixed part 118 and a part 121 hinged at 122 to the rear edge of the part 119. Similarly, the rear ends of the combustor nozzle passages 114a, and 114b are bounded at the top by flaps consisting of parts 119a, 119b hinged at 120a and 120b and parts 121a, 121b, hinged at 122a and 122b. It is only necessary for the flaps to extend to a position about half way between the throat 117 and the trailing edge 116′, the trailing edges 121′, 121′a, and 121′b of the flaps being thus spaced upstream from the trailing edges 116, 116a and 116b of the humped members. The positions of the hinges 120 and 120a, 120b may vary a little upstream or downstream of the narrowest part of the constrictions 117, 117a and 117b to obtain a desired control or partial control of the throat area of the nozzles. The humped members 116a of the combustor nozzle passages may be made in two parts 123 and 124 hinged at 125 and 126 to a fixed lower wall 127 so that they can be collapsed downwards as indicated by the chain-dotted lines to vary the width of the constrictions 117a and 117b, or in some cases, depending on the configuration and control of the air intake, it may suffice to make them non-adjustable like the humped member 116 of the turbojet nozzle, such variation of throat area as may be required being obtained by suitable positioning of the hinges 120a and 120b.

The flaps and the collapsible humped members are adjusted to control the divergencies and throat areas of the nozzle passages in accordance with the following principles. At the designed cruising flight Mach number the flaps are all in alignment with the fixed part 118 of the upper boundary member and the members 116a and 116b are fully raised as shown in full lines in FIGURES 10 and 11, the shapes of the humped members being chosen to provide the throat areas at the constrictions 117, 117a and 117b and the nozzle divergencies requisite at this flight Mach number. At take-off and for flight up to the Mach number at which the combustors are lit, the humped members 116a and 116b are also in the raised full-line position but the flaps 119a, 121a and 119b, 121b pertaining to the combustor duct nozzles are lowered to the position A shown in dotted lines in FIGURE 11 in which the nozzles become convergent and the exit area is reduced to that with which the internal drag of the plant is a minimum, the tapered external configuration also reducing the external drag. During this phase propulsion is effected by the turbojet engine 110 alone, and the flaps 119 and 121 pertaining to its nozzle are lowered into the position B shown in dotted lines in FIGURE 10 in which there is little or no divergence beyond the zone of the constriction 117. Simultaneously with lighting-up of the combustors 111a and 111b, the humped members 116a and 116b are collapsed to their lowest positions C and the flaps 119a, 121a and 119b, 121b are raised somewhat to the positions C′ shown in single dot chain lines in FIGURE 11, the nozzle shape thus formed being convergent. As the flight Mach number increases, the humped members 116a and 116b are raised progressively through the intermediate position D and reach the full-line position on attainment of the cruising flight Mach number. At the same time the flaps 119a, 121a and 119b, 121b are raised progressively through the intermediate position D′ to the full-line position and the flaps 119 and 121 are raised progressively through the intermediate position E to the full-line position.

Actuators for moving the humped members and flaps as described may be housed in the space between the humped member 116 and the lower wall 127, and transmission linkage for the flaps may be housed in the hollow partitions 115a and 115b.

The actuators are controlled by a control system generally similar to that shown in FIGURE 5, but modified as shown in FIGURE 12. In this case the turbojet nozzle divergence actuator 137 operates the flaps 119 and 121 pertaining to the turbojet nozzle passage 112 and combustor nozzle flap actuator 138 operates the flaps 119a, 121a and 119b, 121b pertaining to the combustor nozzle passages 114a and 114b, and the combustor nozzle throat area actuator 148 (which is controlled by the intake shock position senser) operates the humped members 116a and 116b. The combustor nozzle open-close actuator 48a of FIGURE 5 is not required, but the light-up control 188 is given an override action on the flap actuator 138 as well as on the humped member actuator 148 to readjust these members upon lighting-up of the combustors.

The nozzles may be arranged in two rows on either side of a central plane, with the humped members adjacent to the central plane. FIGURE 13 shows an arrangement in which each turbojet engine has twin nozzle passages 212 and 312, and each combustor duct has twin nozzle passages 214 and 314. Actuators 137, 138 and 139 for the turbojet nozzle flaps, the combustor nozzle flaps and the combustor nozzle humped member respectively are housed in the space 140, and operate through linkages, not shown, in the hollow partition 115.

FIGURE 14 shows an arrangement for use with turbojet engines and combustor ducts superimposed in pairs, the turbojet engines each having a single nozzle passage 112a, 112b, and the combustor ducts each having a single nozzle passage 114a, 114b.

Figure 16:
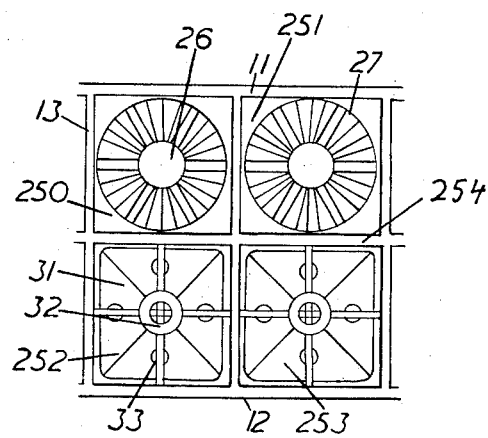
FIGURE 16 is a view of a modification looking downstream into the engines.

FIG. 16 shows two pairs of turbojet engines 250 and 251, and combustor ducts 252 and 253, arranged on either side of a central plane 254, which are intended to be situated adjacent to the nozzles 112a, 112b, 114a, 114b, of FIGURE 14.

FIGURE 15 shows one form of linkage between a flap and an actuator. The hinge pin 120 of the front part 119 carries a crank 141 linked to a crank 142 on the shaft of a rotary actuator 137. The hinge pin 122 of the rear part 121 carries a crank 143 connected by a link 144 to a fixed pivot 145. In arrangements where two similar nozzles are superimposed, the actuator shaft carries a second crank 342 to operate the lower flap. These linkages are so proportioned that as the trailing end of the flap 119 is lowered by turning the levers 141, 142 the lever 143, owing to the anchorage 144 at its free end, causes the flap 121 to turn through a greater angle than the flap 119 so that the flap assembly becomes concave inwardly.

We claim:

1. Aircraft jet propulsion power plant comprising walls enclosing a main duct having a forwardly facing air intake opening at one end and an outlet end, at least one turbojet engine and at least one combustor duct engine, the engines being mounted in the main duct side by side and spaced from the inlet and outlet ends, and walls extending from the engines to the outlet end of the main duct so as to divide that part of the main duct into separate outlet nozzles, one for each engine, the walls of the turbojet nozzle including means for changing its divergence but not its throat area and the walls of the combustor duct nozzle including throat area changing means, and means responsive to change of position of a normal shock wave in the main duct between the inlet and the engines, and operative upon the combustor nozzle throat area changing means to oppose such change of position, a combustor fuel flow control and means responsive to the combustor nozzle throat area approaching its maximum for acting on the combustor fuel flow control to reduce the supply of fuel.

2. A power plant according to claim 1 including a flight Machmeter and a system linking the combustor nozzle throat area adjusting means to the Machmeter so that at subsonic flight Mach numbers the throat area is dependent solely on flight Mach number and at supersonic flight Mach numbers the throat area is determined by the means responsive to change of position of a normal shock wave in the main duct.

3. Aircraft jet propulsion power plant comprising walls enclosing a main duct having a forwardly facing air intake opening at one end and an outlet end, at least one turbojet engine and at least one combustor duct engine, the engines being mounted in the main duct side by side and spaced from the inlet end, and walls extending from the engines to the outlet end of the main duct so as to divide that part of the main duct into separate outlet nozzles, one for each engine, and a turbojet fuel flow governor and a combustor fuel flow governor, both governors having datum changing members, a power selector having an output member moving in response to changes in power demand, a variable ratio transmission connecting each of the datum changing members to the output member, and a flight Machmeter arranged to control the ratios of the transmissions in response to flight Mach number.

4. A power plant according to claim 3 including means associated with the flight Machmeter for maintaining the transmission connecting the output to the datum changing member of the turbojet fuel flow governor disengaged at flight Mach numbers above a predetermined supersonic Mach number.

5. A power plant according to claim 4 including means associated with the flight Machmeter for moving the datum changing member of the turbojet fuel flow governor in response to flight Mach number when that datum changing member is disengaged from the output member.

6. Aircraft jet propulsion power plant comprising walls enclosing a main duct having a forwardly facing air intake opening at one end and an outlet end; at least one turbojet engine and at least one combustor duct engine, the engines being mounted in the main duct side by side and spaced from the inlet and outlet ends; walls extending from the engines to the outlet end of the main duct so as to divide that part of the main duct into separate outlet nozzles one for each engine, the walls of each combustor duct nozzle including throat area changing means; means responsive to change of position of a normal shock wave in the main duct between the inlet and the engines, and operative upon the combustor nozzle throat area changing means to oppose such change of position, a combustor fuel flow control, and means responsive to the combustor nozzle throat area approaching its maximum for acting on the combustor fuel flow control to reduce the supply of fuel.

7. Aircraft jet propulsion power plant comprising walls enclosing a main duct having a forwardly facing air intake opening at one end and an outlet end; at least one turbojet engine and at least one combustor duct engine, the engines being mounted in the main duct side by side, and spaced from the inlet and outlet ends; walls extending from the engines to the outlet end of the main duct so as to divide that part of the main duct into separate outlet nozzles one for each engine, the walls of each combustor duct nozzle including throat area changing means; means responsive to change of position of a normal shock wave in the main duct between the inlet and the engines, and operative upon the combustor nozzle throat area changing means to oppose such change of position, a flight Machmeter, and a system linking the combustor duct nozzle throat area changing means to the Machmeter so that at subsonic flight Mach numbers the throat area is dependent solely on Mach number and at supersonic flight Mach numbers the throat area is determined by the means responsive to change of position of a normal shock wave in the main duct.

References Cited in the file of this patent

UNITED STATES PATENTS

| | | |
|---|---|---|
| 2,631,425 | Nordfors | Mar. 17, 1953 |
| 2,696,078 | Waitzman | Dec. 7, 1954 |
| 2,788,635 | Ford | Apr. 16, 1957 |
| 2,821,350 | Smurik | Jan. 28, 1958 |
| 2,840,322 | Griffith | June 24, 1958 |
| 2,900,789 | Philpot | Aug. 25, 1959 |
| 2,930,186 | Ashwood | Mar. 29, 1960 |
| 2,951,660 | Giliberty | Sept. 6, 1960 |
| 2,955,414 | Hausmann | Oct. 11, 1960 |
| 2,956,398 | Muhlfelder | Oct. 18, 1960 |
| 2,956,759 | Creasey | Oct. 18, 1960 |
| 2,973,921 | Price | Mar. 7, 1961 |

FOREIGN PATENTS

| | | |
|---|---|---|
| 140,860 | Sweden | June 16, 1953 |
| 788,359 | Great Britain | Jan. 2, 1958 |
| 1,130,131 | France | Sept. 17, 1956 |